April 24, 1934.  L. G. COPEMAN  1,955,950
METHOD OF TREATING FRUIT OR OTHER GROWING VEGETABLE MATTER
Filed May 17, 1932

INVENTOR.
Lloyd G. Copeman
BY Barnes, Kissell & Laughlin
ATTORNEYS.

Patented Apr. 24, 1934

1,955,950

UNITED STATES PATENT OFFICE 1,955,950

METHOD OF TREATING FRUIT OR OTHER GROWING VEGETABLE MATTER

Lloyd G. Copeman, Flint, Mich., assignor to Copeman Laboratories Company, Flint, Mich., a corporation of Michigan Application May 17, 1932, Serial No. 611,866

2 Claims. (Cl. 47—58)

This invention relates to a method of treating fruit or other growing vegetable matter to protect the same and facilitate the development of healthy, good fruit.

It is the object of the invention to provide a protective covering for the fruit during its growth to shield it from harm and at the same time not interfere with its proper development.

Grapefruit and other citrus fruits, apples, and may other kinds of fruit and vegetables are subject to deterioration on the trees or in the field by reason of the ravages of insects, pests, parasites, birds, etc. Numerous palliatives and remedies have been proposed in the way of sprays of poisons, etc., but these are not always effective and are dangerous and undesirable in use.

I have found that fruit such as grapefruit, apples, oranges, lemons, etc. can be covered with a protective coating of latex or similar material. This coating, being relatively thin, has several novel properties that are advantageous under these circumstances. One is that it is a self-adhering material. The second is that the same is substantially air tight. The third is that it has such great elasticity that it permits the growth of the fruit without rupturing the covering. The fourth is that the covering is somewhat transparent to permit the penetration of those rays of the sun which are needed in the ripening and development of the fruit.

Figure 1:
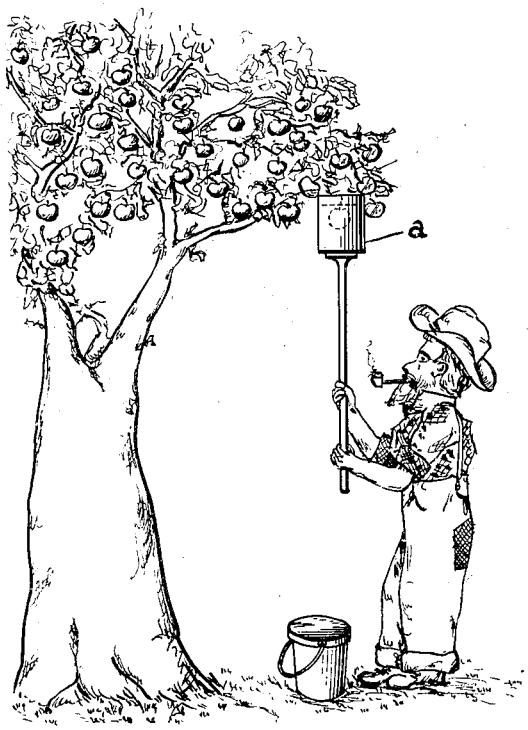
Fig. 1 is a perspective view showing the treatment being applied to a fruit tree.
Figure 2:
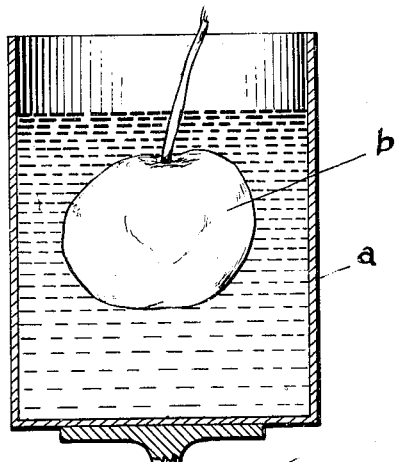
Fig. 2 is an enlarged vertical section showing the fruit undergoing treatment.
Figure 3:
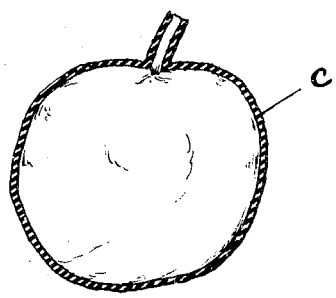
Fig. 3 is a perspective view of a young apple with a protecting coating shown in section.
Figure 4:
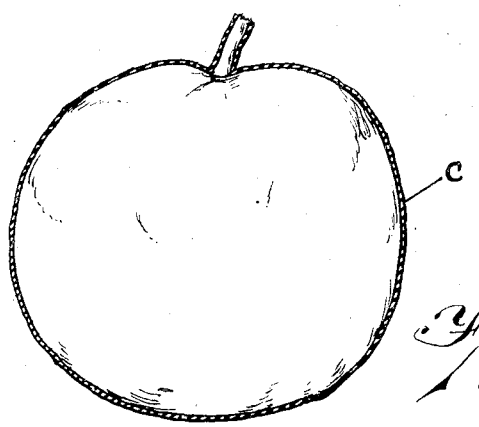
Fig. 4 is a perspective view of a fully developed apple with the protecting coating shown in section.

The latex is the sap from the rubber tree. The latex may be used in its natural state or may be in a diluted state by reason of the addition of well-known ingredients. The apple is preferably dipped in the latex by bring a vessel $a$ up under the fruit as is shown in Figs. 1 and 2 where the fruit is designated $b$. Enough of the latex or rubber sap will cling to the fruit to form such a protective coating as is desired. If desired accelerators can be used in the liquid latex for hastening the solidification of the liquid latex upon the fruit. If it is desired to provide an even more durable coating for the fruit, the second or third application may be made. Desirable results can be had by the single application of the coating. This coating is preferably applied when the fruit is only about half developed and when it is in the green state and before the fruit is inviting to insects, parasites, birds, etc. Fig. 3 shows how the coating is of appreciable thickness as at $c$ while in Fig. 4 the growth of the apple has materially thinned the coating by stretching. Of course, in both these views the actual thickness of the coating is exaggerated for the purposes of illustration.

This treatment will be found very efficacious in protecting the fruit during the trying period of its growth and ripening. Furthermore, it has the very marked advantage of protecting the fruit when being picked, and it can be left on the fruit as a natural preservative in shipment.

I do not limit myself to applying the latex in the way illustrated in the drawing because the same could be sprayed on or applied in other ways. I also want it understood that in using the term "latex" that I am not to be strictly limited to rubber sap, but to include other substances or equivalents that have the same or similar properties.

I want it understood also that in using the term "fruit" in the claims, this refers to not only fruit as is commonly known, but even vegetables and other articles that present similar problems and similar circumstances.

It will be understood that in using the different kinds of pure latex that a single thin film, while being moisture proof, will be slightly permeable as to air, or in other words, the article coated can "breathe" while still being protected. If a latex carrying accelerator is used to present a positive vulcanization, then the resulting coating is permeable to all fluids.

What I claim is:

1. The method of protecting growing fruit and the like, which comprises the immersion of growing fruit in liquid latex contained in a vessel applied under the fruit allowing the adhering latex to dry and develop into a protective coating of substantially air tight elastic material.

2. The method of protecting growing fruit and the like, which comprises the coating of growing fruit with a thin layer of an aqueous dispersion of rubber, evaporating the liquid solvent to deposit a thin continuous elastic film around the fruit whereby said film protects the fruit and expands with the fruit during the growing period without rupturing, said expanded elastic film continuing to protect the fruit after ripening, then tearing off said elastic film to expose the fruit.

LLOYD G. COPEMAN.